United States Patent
Ohuchi et al.

(10) Patent No.: US 7,532,387 B2
(45) Date of Patent: May 12, 2009

(54) PARTICLES FOR DISPLAY MEDIA AND INFORMATION DISPLAY PANEL USING THE PARTICLES

(75) Inventors: Takao Ohuchi, Hamura (JP); Kazuya Murata, Hino (JP)

(73) Assignee: Bridgestone Corporation, Tokyo (JP)

( * ) Notice: Subject to any disclaimer, the term of this patent is extended or adjusted under 35 U.S.C. 154(b) by 20 days.

(21) Appl. No.: 11/730,882

(22) Filed: Apr. 4, 2007

(65) Prior Publication Data

US 2007/0236776 A1 Oct. 11, 2007

(30) Foreign Application Priority Data

Apr. 5, 2006 (JP) ............................. 2006-104148
Apr. 2, 2007 (JP) ............................. 2007-096159

(51) Int. Cl.
*G02B 26/00* (2006.01)
*G09G 3/34* (2006.01)

(52) U.S. Cl. ...................................... 359/296; 345/107

(58) Field of Classification Search .................. 359/296; 345/107; 430/32; 204/600
See application file for complete search history.

(56) References Cited

U.S. PATENT DOCUMENTS 6,117,368 A 9/2000 Hou
2005/0267263 A1 12/2005 Minami

FOREIGN PATENT DOCUMENTS

JP 2006-72219 A 3/2006

OTHER PUBLICATIONS

European Search Report dated Jul. 16, 2007.

*Primary Examiner*—William C Choi
(74) *Attorney, Agent, or Firm*—Sughrue Mion, PLLC (57) ABSTRACT

In the particles for display media constituting the display media used for an information display panel, in which the display media having optical reflectance and charge characteristics are sealed between two substrates, at least one substrate being transparent, and, in which the display media, to which an electrostatic field is applied, are made to move so as to display information such as an image, the particles for display media having a substantially circular shape produced by a suspension polymerization of particle materials including monomer, wherein a part of the monomer is a cross-linking monomer and an amount of the cross-linking monomer is not less than 10 parts by weight and less than 50 parts by weight. By using the particles mentioned above, it is possible to obtain high heat resistance and low drive voltage (drive electric field).

10 Claims, 5 Drawing Sheets

PARTICLES FOR DISPLAY MEDIA AND INFORMATION DISPLAY PANEL USING THE PARTICLES

BACKGROUND OF THE INVENTION

1. Field of the Invention

The present invention relates to the particles for display media and the information display panel using the above particles, in which the display media having optical reflectance and charge characteristics are sealed between two substrates, at least one substrate being transparent, and, in which the display media, to which an electrostatic field is applied, are made to move so as to display information such as an image.

2. Description of Related Art

As an information display device substitutable for liquid crystal display (LCD), information display devices with the use of technology such as an electrophoresis method, an electro-chromic method, a thermal method, dichroic-particles-rotary method are proposed.

As for these information display devices, it is conceivable, as compared with LCD, as inexpensive visual display device of the next generation from a merit having wide field of vision close to normal printed matter, having smaller consumption, or having a memory function, and spreading out to a display for portable device and an electronic paper is expected. Recently, electrophoresis method is proposed that microencapsulate dispersion liquid made up with dispersion particles and coloration solution and dispose the liquid between faced substrates, and also it is expected.

However, in the electrophoresis method, there is a problem that a response rate is slow by the reason of viscosity resistance because the particles migrate among the electrophoresis solution. Further, there is a problem of lacking imaging repetition stability, because particles with high specific gravity of titanium oxide is scattered within solution of low specific gravity, it is easy to subside, difficult to maintain a stability of dispersion state. Even in the case of microencapsulating, cell size is diminished to a microcapsule level in order to make it hard to appear, however, an essential problem was not overcome at all.

Besides the electrophoresis method using behavior in the solution, recently, a method wherein electro-conductive particles and a charge transport layer are installed in a part of the substrate without using solution is proposed. [The Imaging Society of Japan "Japan Hardcopy '99" (Jul. 21-23, 1999) Transaction Pages 249-252] However, the structure becomes complicated because the charge transport layer and further a charge generation layer are to be arranged. In addition, it is difficult to constantly dissipate charges from the electro-conductive particles, and thus there is a drawback on the lack of stability during display rewriting.

As one method for overcoming the various problems mentioned above, an information display panel is known, in which the display media having optical reflectance and charge characteristics are sealed between two substrates, at least one substrate being transparent, and, in which the display media, to which an electrostatic field is applied, are made to move so as to display information such as an image. In the information display panel, in which the display media are moved by an electrostatic field so as to display information such as an image, in order to make easy for the display media to have positively or negatively chargeable properties and to maintain a charge amount, use is made of acrylic resin, methacrylic resin and styrene resin as materials of the particles for display media having a particle diameter of 0.1-50 μm. As a producing method, in order to make the process simple or to make the energy consumption low, or, in order to obtain directly the target particle diameter, it is effective to use a suspension polymerization method as compared with a crushing method. Moreover, when the particles for display media made of resin are produced by the suspension polymerization method, one functional monomer, which is dispersed as an oil drop in a suspended solution by using normally a surface activating agent, is polymerized to make it high molecular weight.

As mentioned above, when the particles for display media produced by using one functional monomer as the resin materials are used for the information display panel, there is a problem such that a display becomes impossible if it is exposed in a high temperature. The reasons are as follows. Since it is exposed in a high temperature, the particles for display media become a softened state even under a glass transition temperature Tg of its resin, and they are melted and bonded with each other to become a non-movable state. As a result, a display becomes impossible. Further, when the particles for display media are left as they are at room temperature after a display, there is a problem such that a voltage (drive voltage), which is necessary to move the particles for display media after the display, becomes high. The reasons are as follows. Since the resin produced by using one functional monomer have normally a thermal plasticity, the particles for display media produced by using the resin mentioned above have a creeping property even at room temperature. As a result, in the information display panel produced by using the particles for display media mentioned above, the movement of the particles for display media is prevented due to the bonding between the particles for display media, so that the voltage (drive voltage), which is necessary to move the particles for display media after leaving them as they are, becomes high.

As a method of solving the problems mentioned above, it is thought about a method such that a cross-linking monomer is used for example as a part of or all of molecule and use is made of the resin having a higher glass transition temperature Tg. However, when such a resin is used as the particles for display media having a predetermined intended use, a reverse driving property of the particles for display media is decreased if a rate of the cross-linking monomer in molecule becomes higher in some measure. As a result, a display property of information such as an image is decreased. This is empirically demonstrated. Therefore, in order to prevent the problems of a low thermal resistance and a creeping property in the particles for display media as mentioned above, and, in order to satisfy a display property of information such as an image, it is important to suppress a rate of the cross-linking monomer in molecule of the particles for display media within an appropriate range.

SUMMARY OF THE INVENTION

The present invention has for its first object to provide particles for display media, which can make a heat resistance high and can make a drive voltage (drive electrostatic field) low, by setting an amount of the cross-linking monomer used as the monomer capable of copolymerization constituting a part of the raw materials of the particles for display media in a preferable range.

The present invention has for its second object to provide an information display panel constituted by using the particles for display media mentioned above, which has an excellent display quality and a long life on endurance.

In order to achieve the first object, according to the invention, particles for display media constituting the display media used for an information display panel, in which the display media having optical reflectance and charge characteristics are sealed between two substrates, at least one substrate being transparent, and, in which the display media, to which an electrostatic field is applied, are made to move so as to display information such as an image, comprises the particles for display media having a substantially circular shape produced by a suspension polymerization of particle materials including monomer, wherein a part of the monomer is a cross-linking monomer and an amount of the cross-linking monomer is not less than 10 parts by weight and less than 50 parts by weight.

As a preferred embodiment of the particles for display media according to the invention, there are cases: such that the cross-linking monomer is divinylbenzen capable of copolymerization, and, in the case of being polymerized by elementary substance, a glass transition temperature Tg of the resin is not less than 130° C., or, the glass transition temperature Tg is not observed; such that another monomer for copolymerizing the cross-linking monomer is one or more monomers selected from the plural groups of monomers including at least acrylic monomer, methacrylic monomer and styrene monomer; such that a glass transition temperature Tg of the resin constituting the particles for display media is not less than 60° C.; such that a charge amount of the particles for display media measured by a blow-off method utilizing carriers is 10-100 µC/g in an absolute value; such that the particles in which the maximum surface potential, in the case that the surface of the particles is charged by a generation of Corona discharge caused by applying a voltage of 8 KV to a Corona discharge device deployed at a distance of 1 mm from the surface, is 300 V or greater at 0.3 second after the discharge; and such that a color of the particles for display media is a white color and/or a black color.

In order to achieve the second object, according to the invention, an information display panel comprises a construction: such that at least one or more groups of display media including the particles for display media mentioned above are sealed between two opposed substrates, at least one substrate being transparent; and such that the display media, to which an electrostatic field is applied, are made to move so as to display information such as an image.

In the particles for display media according to the invention mentioned above, since particles for display media constituting the display media used for an information display panel, in which the display media having optical reflectance and charge characteristics are sealed between two substrates, at least one substrate being transparent, and, in which the display media, to which an electrostatic field is applied, are made to move so as to display information such as an image, comprises the particles for display media having a substantially circular shape produced by a suspension polymerization of particle materials including monomer, wherein a part of the monomer is a cross-linking monomer and an amount of the cross-linking monomer is not less than 10 parts by weight and less than 50 parts by weight, the particles for display media have a high heat resistance and a low drive voltage (drive electrostatic field).

In the information display panel according to the invention mentioned above, an information display panel comprises a construction: such that at least one or more groups of display media including the particles for display media mentioned above are sealed between two opposed substrates, at least one substrate being transparent; and such that the display media, to which an electrostatic field is applied, are made to move so as to display information such as an image, the information display panel has an excellent display quality and a long life on endurance as demonstrated in the following examples.

DESCRIPTION OF THE PREFERRED EMBODIMENT

Hereinafter, best mode for carrying out the invention will be explained with reference to the drawings.

At first, a basic construction of an information display panel according to the present invention will be explained. In the information display panel used in the present invention, an electrostatic field is applied to display media sealed in the space between two opposed substrates. Along a direction of the applied electrostatic field by means of the force of the electrostatic field, Coulomb's force or the like, the charged display media are attracted and moved by varying a direction of electrostatic field. Accordingly, information such as an image or the like can be displayed. Therefore, it is necessary to design the information display panel in such a manner that the display media can move evenly and maintain stability during a reciprocal operation or during a reserving state. Here, as to forces applied to the particles constituting display media, there are an attraction force between the particles due to Coulomb' force, an imaging force with respect to the electrodes or substrates, an intermolecular force, a liquid bonding force, a gravity and the like.

Examples of the information display panel that is a object of the invention will be explained with reference to FIGS. 1a and 1b-FIGS. 3a and 3b.

In the examples shown in FIGS. 1a and 1b, at least two or more groups of display media 3 having different optical reflectance and different charge characteristics and consisting of at least one or more groups of particles (here, white color display media 3W made of the particles for white color display media 3Wa and black color display media 3B made of the particles for black color display media 3Ba are shown) are moved in a perpendicular direction with respect to substrates 1 and 2, in accordance with an electric field applied outside of the substrates 1 and 2, so as to display a black color by viewing the black color display media 3B to an observer or so as to display a white color by viewing the white color display media 3W to the observer. In the example shown in FIG. 1b, a cell is formed by arranging for example grid-like partition walls 4 between the substrates 1 and 2, in addition to the example shown in FIG. 1a. Moreover, in FIG. 1b, the partition walls arranged at the near side are omitted.

In the examples shown in FIGS. 2a and 2b, at least two or more groups of display media 3 having different optical reflectance and different charge characteristics and consisting of at least one or more groups of particles (here, white color display media 3W made of the particles for white color display media 3Wa and black color display media 3B made of the particles for black color display media 3Ba are shown) are moved in a perpendicular direction with respect to substrates 1 and 2, in accordance with an electric field generated by applying a voltage between an electrode 5 arranged to the substrate 1 and an electrode 6 arranged to the substrate 2, so as to display a black color by viewing the black color display media 3B to an observer or so as to display a white color by viewing the white color display media 3W to the observer. In the example shown in FIG. 2b, a cell is formed by arranging for example grid-like partition walls 4 between the substrates 1 and 2, in addition to the example shown in FIG. 2a. Moreover, in FIG. 2b, the partition walls arranged at the near side are omitted.

In the examples shown in FIGS. 3a and 3b, at least one group of display media 3 having optical reflectance and charge characteristic and consisting of at least one or more groups of particles (here, white color display media 3W made of the particles for white color display media) are moved in a parallel direction with respect to substrates 1 and 2, in accordance with an electric field generated by applying a voltage between the electrode 5 arranged to the substrate 1 and the electrode 6 arranged to the substrate 1, so as to display a white color by viewing the white color display media 3W to an observer or so as to display a color of the electrode 6 or the substrate 1 by viewing a color of the electrode 6 or the substrate 1 to the observer. In the example shown in FIG. 3b, a cell is formed by arranging for example grid-like partition walls 4 between the substrates 1 and 2, in addition to the example shown in FIG. 3a. Moreover, in FIG. 3b, the partition walls arranged at the near side are omitted.

Hereinafter, the particles for display media, which are the feature of the invention, will be explained in detail. The particles for display media according to the invention can be applied to the information display panel having the constructions shown in FIGS. 1a, 1b-FIGS. 3a, 3b, and they are sealed between two substrates (at least one substrate is transparent) as the display media in the information display panel mentioned above. As the particles for display media, use is made of the particles having a substantially circular shape produced by a suspension polymerization of particle materials including monomer, wherein a part of the monomer is a cross-linking monomer and an amount of the cross-linking monomer is not less than 10 parts by weight and less than 50 parts by weight. As the cross-linking monomer capable of copolymerization, it is preferred to use for example divinylbenzen, which is the resin having sufficient heat resistance. Moreover, it is necessary for the cross-linking monomer capable of copolymerization mentioned above to be mixed at a predetermined mixing rate (that is, content=not less than 10 parts by weight and less than 50 parts by weight). In this case, if the content is less than 10 parts by weight, a sufficient heat resistance cannot be obtained, and, if the content is not less than 50 parts by weight, display properties such as contrast, endurance and so on are deteriorated.

In addition, the following cases are preferred: such that, when the cross-linking monomer capable of copolymerization mentioned above is polymerized by elementary substance, a glass transition temperature Tg of the resin is not less than 130° C., or, the glass transition temperature Tg is not observed; such that another monomer for copolymerizing the cross-linking monomer is one or more monomers selected from the plural groups of monomers including at least acrylic monomer, methacrylic monomer and styrene monomer; such that a glass transition temperature Tg of the resin constituting the particles for display media is not less than 60° C.; such that a charge amount of the particles for display media measured by a blow-off method utilizing carriers is 10-100 μC/g in an absolute value; such that the particles in which the maximum surface potential, in the case that the surface of the particles is charged by a generation of Corona discharge caused by applying a voltage of 8 KV to a Corona discharge device deployed at a distance of 1 mm from the surface, is 300 V or greater at 0.3 second after the discharge; and such that a color of the particles for display media is a white color and/or a black color.

In the particles for display media according to the invention, since the particles for display media used for the information display panel having the constructions shown in FIGS. 1a, 1b-FIGS. 3a, 3b have a substantially circular shape produced by a suspension polymerization of particle materials including monomer, wherein a part of the monomer is a cross-linking monomer and an amount of the cross-linking monomer is not less than 10 parts by weight and less than 50 parts by weight, the particles for display media achieve an excellent heat resistance and a low drive voltage (drive electrostatic field) as demonstrated by the examples explained hereinafter. Moreover, the information display panel shown in FIGS. 1a, 1b-FIGS. 3a, 3b utilizing the particles for display media mentioned above achieves an excellent endurance and an excellent display quality.

Hereinafter, respective members constituting the information display panel according to the invention will be explained.

As the substrate, at least one of the substrates is the transparent substrate through which a color of the display media can be observed from outside of the panel, and it is preferred to use a material having a high transmission factor of visible light and an excellent heat resistance. The other substrate may be transparent or may be opaque. Examples of the substrate material include polymer sheets such as polyethylene terephthalate, polyethylene naphthalate, polyether sulfone, polyethylene, polycarbonate, polyimide or acryl and metal sheets having flexibility and inorganic sheets such as glass, quartz or so having no flexibility. The thickness of the substrate is preferably 2 to 5000 μm, more preferably 5 to 2000 μm. When the thickness is too thin, it becomes difficult to maintain strength and distance uniformity between the substrates, and when the thickness is thicker than 5000 μm, there is a drawback as a thin-type information display panel.

As a material of the electrode arranged to the substrate according to need, use is made of metals such as aluminum, silver, nickel, copper, gold, or, conductive metal oxides such as indium tin oxide (ITO), indium oxide, conductive tin oxide, antimony tin oxide (ATO), conductive zinc oxide and so on, or, conductive polymers such as polyaniline, polypyrrole, polythiophene and so on, and they are used by being suitably selected. As an electrode forming method, use is made of a method in which the materials mentioned above are made to a thin film by means of sputtering method, vacuum vapor deposition method, CVD (chemical vapor deposition) method, coating method and so on, or, a method in which conductive materials and solvents are mixed with synthetic resin binder and the mixture is sprayed to perform pattering. A transparency is necessary for the electrode arranged to the substrate at an observation side (display surface side), but it is not necessary for the electrode arranged to the substrate at a rear side. In both cases, the materials mentioned above, which are transparent and have a pattern formation capability, can be suitably used. Additionally, the thickness of the electrode may be suitable unless the electro-conductivity is absent or any hindrance exists in optical transparency, and it is preferable to be 3 to 1000 nm, more preferable to be 5 to 400 nm. The material and the thickness of the electrode arranged to the rear substrate are the same as those of the electrode arranged to the substrate at the display side, but transparency is not necessary. In this case, the applied outer voltage may be superimposed with a direct current or an alternate current.

As the partition wall arranged to the substrate according to need, a shape of the partition wall is suitably designed in accordance with a kind of the display media used for the display and is not restricted. However, it is preferred to set a width of the partition wall to 2-100 µm more preferably 3-50 µm and to set a height of the partition wall to 10-100 µm more preferably 10-50 µm.

Moreover, as a method of forming the partition wall, use may be made of a double rib method wherein ribs are formed on the opposed substrates respectively and they are connected with each other and a single rib method wherein a rib is formed on one of the opposed substrates only. The present invention may be preferably applied to both methods mentioned above.

Figure 1:
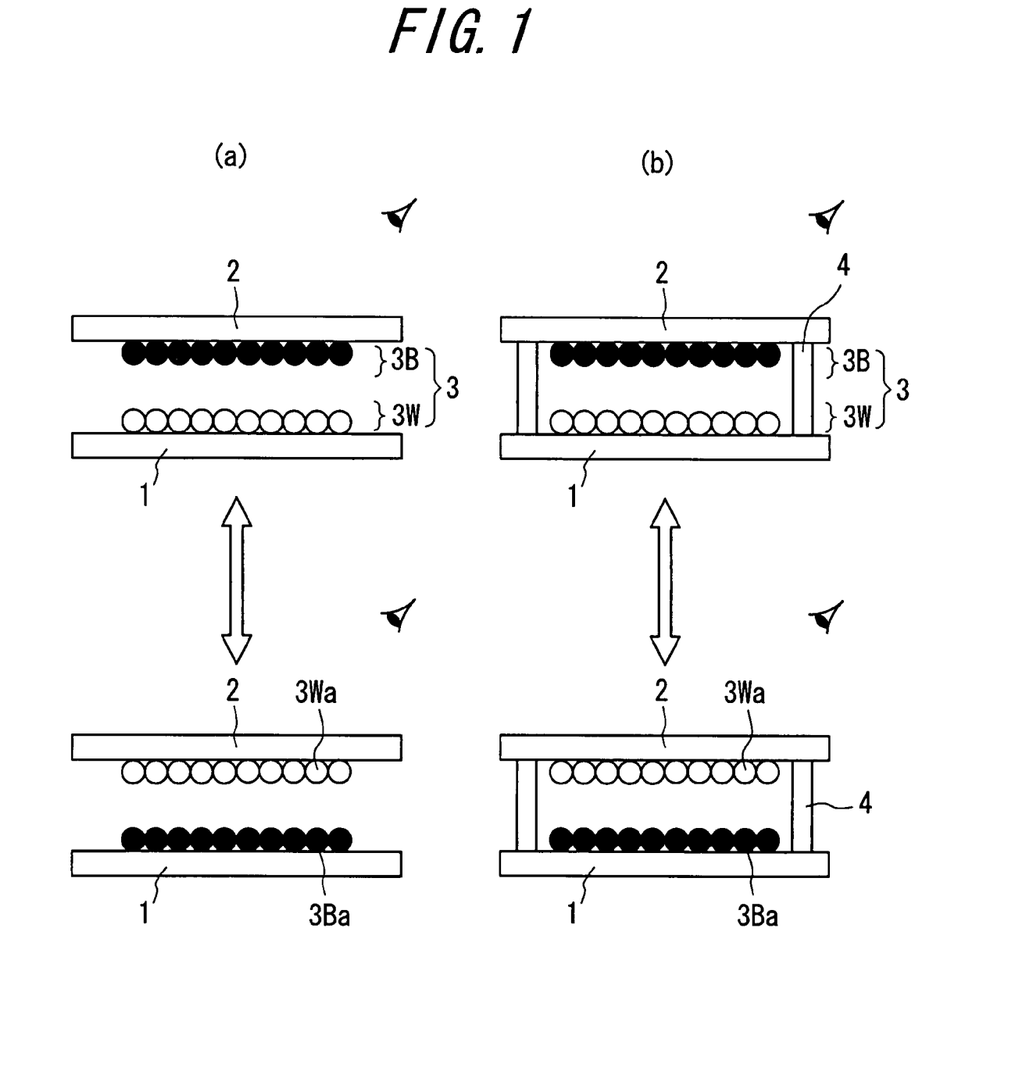
FIGS. 1a and 1b are schematic views respectively showing one embodiment of the information display panel according to the invention.
Figure 2:
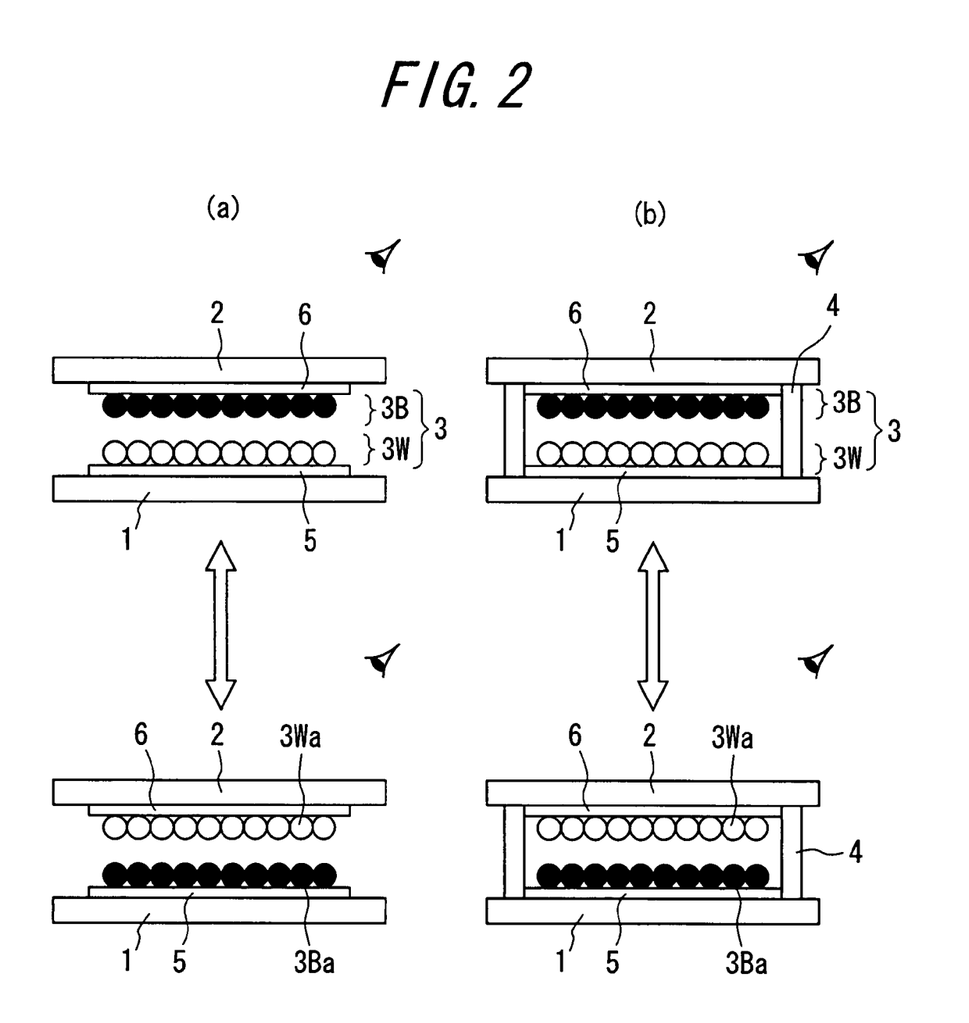
FIGS. 2a and 2b are schematic views respectively illustrating another embodiment of the information display panel according to the invention.
Figure 3:
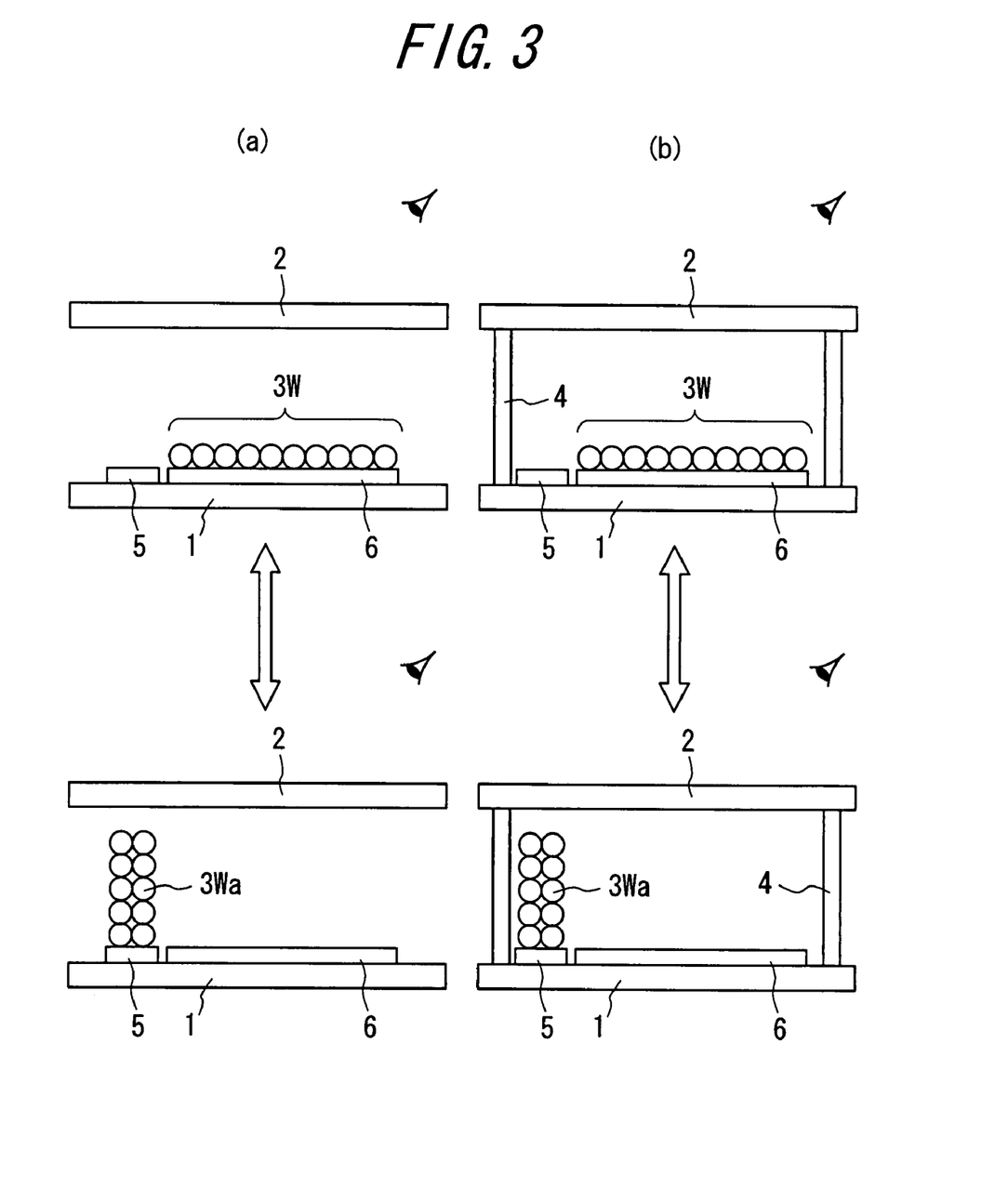
FIGS. 3a and 3b are schematic views respectively depicting still another embodiment of the information display panel according to the invention.
Figure 4:
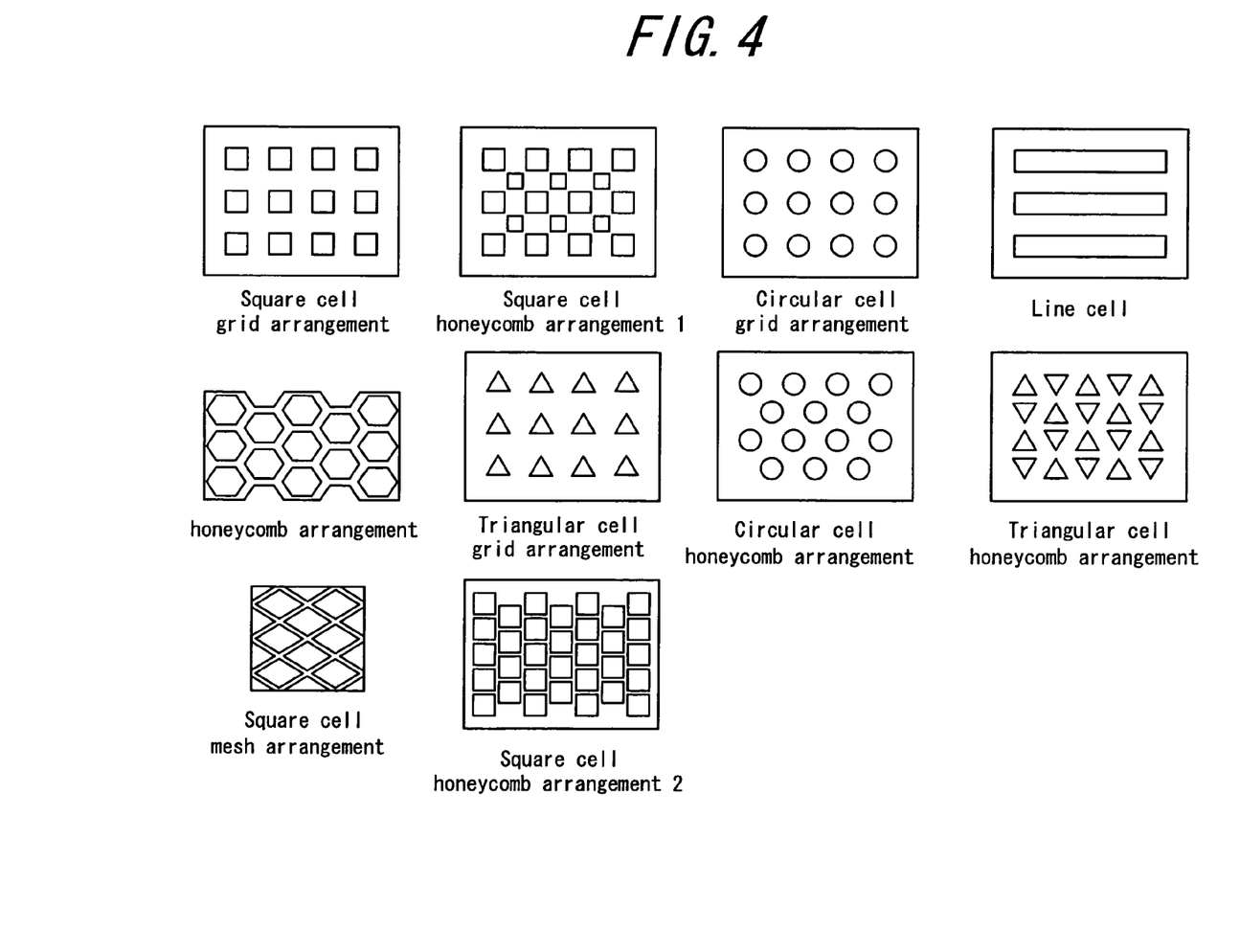
FIG. 4 is a schematic view showing one embodiment of a shape of the partition walls in the information display panel according to the invention.

The cell formed by the partition walls each made of rib has a square shape, a triangular shape, a line shape, a circular shape and a hexagon shape, and has an arrangement such as a grid, a honeycomb and a mesh, as shown in FIG. 4 viewed from a plane surface of the substrate. It is preferred that the portion corresponding to a cross section of the partition wall observed from the display side (an area of the frame portion of the cell) should be made as small as possible. In this case, a clearness of the image display can be improved.

The formation method of the partition wall is not particularly restricted, however, a die transfer method, a screen-printing method, a sandblast method, a photolithography method and an additive method may be preferably used. Among them, it is preferred to use a photolithography method using a resist film or a die transfer method.

Although the method for charging the particles negatively or positively is not particularly limited, a corona discharge method, an electrode injection-charge method, a friction charge method and so on are employable. It is preferred that the particle measured by a blow-off method by using carriers has a charge amount of 10-100 µC/g in absolute value. When the absolute value of the charge amount of the particles is smaller than this range, the response speed in response to a deviation of the electrostatic field becomes slower and the memory characteristics become lower. When the absolute value of the charge amount of the particles is larger than this range, an imaging force to the substrate and electrode becomes too stronger. Therefore, the following ability at the inversion of its electric field becomes poor, but the memory characteristic is favorable.

In the invention, a charge amount measuring method is as follows.

<Blow-Off Measuring Theory and Method>

In the blow-off method, a mixture of the particles and the carriers are placed into a cylindrical container with nets at both ends, and high-pressure gas is blown from the one end to separate the powders and the carriers, and then only the powders are blown off from the mesh of the net. In this occasion, charge amount of reverse blown polarity remains on the carriers with the same charge amount of the powders carried away out of the container. Then, all of electric flux by this electric charge are collected to Faraday cage, and are charged across a capacitor with this amount. Accordingly, the charge amount of the particles is determined as Q=CV (C: capacity, V: voltage across both ends of the capacitor) by measuring potential of both ends of the capacitor.

As a blow-off powder charge amount measuring instrument, TB-200 produced by Toshiba Chemical Co., Ltd. was used. In this invention, ferrite carriers are used for the charge amount measurement of the particles to be measured. However, when two groups of display media consisting of the display media constituted by positively chargeable particles and the display media constituted by negatively chargeable particles are mixed to be used in the information display panel, the same kind of carriers are used for measuring a charge amount of the particles for display media constituting respective display media. Specifically, use is made of DFC100 WRINKLE (ferrite including Mn—Mg) produced by DOWA IRON POWDER CO,. LTD. as the carriers, and a charge amount of the particles (µC/g) is measured.

Because it is necessary for the particles to hold the charged electric charge, insulating particles with the volume specific resistance of $1\times10^{10}$ Ω·cm or greater are preferable, and in particular, insulating particles with the volume specific resistance of $1\times10^{12}$ Ω·cm or greater are more preferable. Further, the particles with slow charge attenuation property evaluated by the measuring method below are more preferable.

That is, the particles to be measured are arranged to a surface of a measurement jig having a roll shape, and the voltage of 8 kV is applied to a Corona generator disposed with a distance of 1 mm to the thus arranged particle surface so as to generate Corona discharge, which charges the particle surface. Then, the change of the surface potential is measured to determine the suitability. In this occasion, it is preferable to select the material whose maximum surface potential will be 300 V or greater more preferably 400 V or greater after 0.3 seconds as the material for composing the particles.

Figure 5:
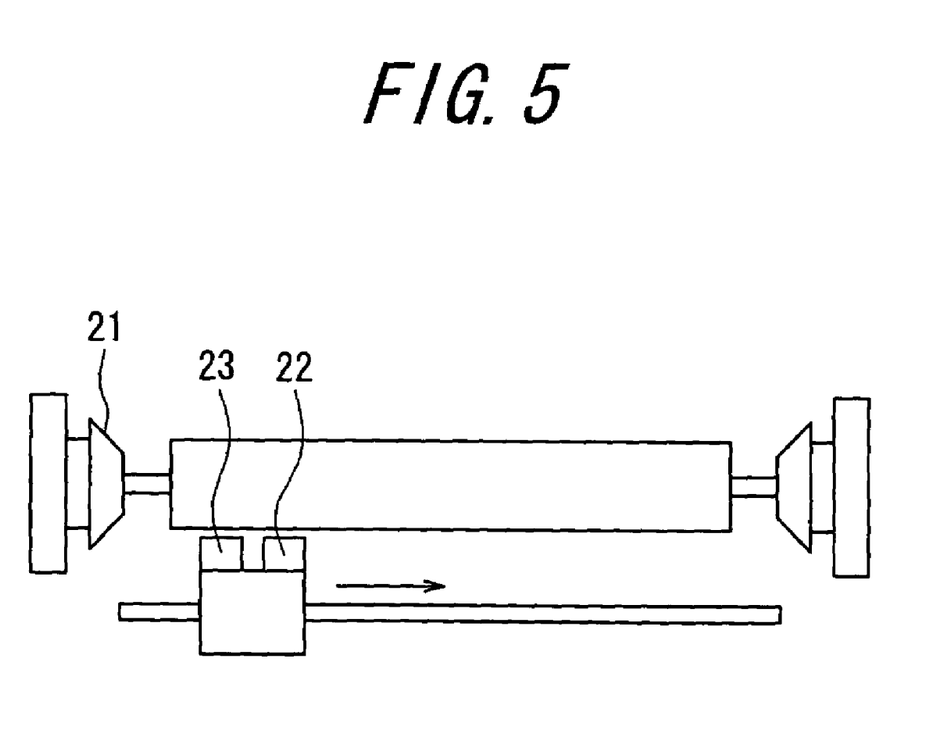
FIG. 5 is a schematic view illustrating a surface potential measuring method of the particles for display media used for the information display panel according to the invention.

Additionally, the foregoing surface potential is measured by means of an instrument (CRT2000 produced by QEA Inc.) as shown in FIG. 5. In this instrument both end portions of a roll shaft being held with chuck 21, compact scorotron discharger 22 and surface potential meter 23 are spaced with predetermined interval to form a measurement unit. Facedly deploying the measurement unit with a distance of 1 mm from the surface of the particles, and by moving the measurement unit from one end portion of the roll shaft to the other end portion with an uniform speed, with the state that the roll shaft remains stopping and while giving surface charge, a method of measuring its surface potential is preferably adopted. Moreover, measurement environment should be settled at the temperature of 25±3° C. and the humidity of 55±5% RH.

Then, the particles for display media (hereinafter, sometimes called as particles) constituting the display media used in the information display panel according to the invention will be explained. The particles for display media are used as the display media as they are, or, used as the display media after they are mixed with another particles.

The particle may be composed of resins as a main ingredient, and can include according to need charge control agents, coloring agent, inorganic additives and so on as is the same as the known one. Hereinafter, typical examples of resin, charge control agent, coloring agent, additive and so on will be explained.

Examples of the electric charge control agent include, but not particularly specified to, negative charge control agent such as salicylic acid metal complex, metal containing azo dye, oil-soluble dye of metal-containing (containing a metal ion or a metal atom), the fourth grade ammonium salt-based compound, calixarene compound, boron-containing compound (benzyl acid boron complex), and nitroimidazole derivative. Examples of the positive charge control agent include nigrosine dye, triphenylmethane compound, the fourth grade ammonium salt compound, polyamine resin, imidazole derivatives, etc. Additionally, metal oxides such as ultra-fine particles of silica, ultra-fine particles of titanium oxide, ultra-fine particles of alumina, and so on; nitrogen-containing circular compound such as pyridine, and so on, and these derivates or salts; and resins containing various organic pigments, fluorine, chlorine, nitrogen, etc. can be employed as the electric charge control agent.

As for a coloring agent, various kinds and colors of organic or inorganic pigments or dye as will be described below are employable.

Examples of black pigments include carbon black, copper oxide, manganese dioxide, aniline black, and activate carbon.

Examples of blue pigments include C.I. pigment blue 15:3, C.I. pigment blue 15, Berlin blue, cobalt blue, alkali blue lake, Victoria blue lake, phthalocyanine blue, metal-free phthalocyanine blue, partially chlorinated phthalocyanine blue, first sky blue, and Indanthrene blue BC.

Examples of red pigments include red oxide, cadmium red, diachylon, mercury sulfide, cadmium, permanent red 4R, lithol red, pyrazolone red, watching red, calcium salt, lake red D, brilliant carmine 6B, eosin lake, rhodamine lake B, alizarin lake, brilliant carmine 3B, and C.I. pigment red 2.

Examples of yellow pigments include chrome yellow, zinc chromate, cadmium yellow, yellow iron oxide, mineral first yellow, nickel titanium yellow, navel orange yellow, naphthol yellow S, hanzayellow G, hanzayellow 10G, benzidine yellow G, benzidine yellow GR, quinoline yellow lake, permanent yellow NCG, tartrazinelake, and C.I. pigment yellow 12.

Examples of green pigments include chrome green, chromium oxide, pigment green B, C.I. pigment green 7, Malachite green lake, and final yellow green G.

Examples of orange pigments include red chrome yellow, molybdenum orange, permanent orange GTR, pyrazolone orange, Balkan orange, Indanthrene brilliant orange RK, benzidine orange G, Indanthrene brilliant orange GK, and C.I. pigment orange 31.

Examples of purple pigments include manganese purple, first violet B, and methyl violet lake.

Examples of white pigments include zinc white, titanium oxide, antimony white, and zinc sulphide.

Examples of extenders include baryta powder, barium carbonate, clay, silica, white carbon, talc, and alumina white. Furthermore, there are Nigrosine, Methylene Blue, rose bengal, quinoline yellow, and ultramarine blue as various dyes such as basic dye, acidic dye, dispersion dye, direct dye, etc.

Examples of inorganic additives include titanium oxide, zinc white, zinc sulphide, antimony oxide, calcium carbonate, pearl white, talc, silica, calcium silicate, alumina white, cadmium yellow, cadmium red, titanium yellow, Pressian blue, Armenian blue, cobalt blue, cobalt green, cobalt violet, ion oxide, carbon black, manganese ferrite black, cobalt ferrite black, copper powder, aluminum powder.

These coloring agents and inorganic additives may be used alone or in combination of two or more kinds thereof. Particularly, carbon black is preferable as the black coloring agent, and titanium oxide is preferable as the white coloring agent.

Moreover, as the particle diameter of the particles for display media, it is preferred to set the particle diameter to 0.1-50 µm and to use even particles. If the particle diameter exceeds this range, the image clearness sometimes deteriorated, and, if the particle diameter is smaller than this range, an agglutination force between the particles becomes too large and the movement of the particles is prevented.

Further, it is preferred that particle diameter distribution Span of the particles for display media, which is defined by the following formula, is less 5 preferably less than 3:

$$\text{Span} = (d(0.9) - d(0.1))/d(0.5);$$

(here, d(0.5) means a value of the particle diameter expressed by µm wherein an amount of the particles having the particle diameter larger than or smaller than this value is 50%, d(0.1) means a value of the particle diameter expressed by µm wherein an amount of the particles having the particle diameter smaller than this value is 10%, and d(0.9) means a value of the particle diameter expressed by µm wherein an amount of the particles having the particle diameter smaller than this value is 90%).

If the particle diameter distribution Span is set to not more than 5, the particle diameter becomes even and it is possible to perform an even particle movement.

Furthermore, as a correlation between the particles for display media, it is preferred to set a ratio of d(0.5) of the particles having smallest diameter with respect to d(0.5) of the particles having largest diameter to not more than 50 preferably not more than 10. The particles having different charge characteristics with each other are moved reversely, even if the particle diameter distribution Span is made smaller. Therefore, it is preferred that the particle sizes of the particles are made to be even with each other, and same amounts of the particles are easily moved in a reverse direction, and thus that is this range.

Here, the particle diameter distribution and the particle diameter mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle diameter, and thus it is possible to measure the particle diameter and the particle diameter distribution.

In the present invention, it is defined that the particle diameter and the particle diameter distribution are obtained by a volume standard distribution. Specifically, the particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

Further, in the dry-type information display panel in which the display media constituted by the particles for display media are driven in an air space, it is important to control a gas in a gap surrounding the display media between the substrates, and a suitable gas control contributes an improvement of display stability. Specifically, it is important to control a humidity of the gap gas to not more than 60% RH at 25° C., preferably not more than 50% RH.

The above gap means a gas portion surrounding the display media obtained by substituting the electrodes 5, 6 (in the case of arranging electrode inside of substrate), an occupied portion of the display media 3, an occupied portion of the partition walls 4 (in the case of arranging partition walls) and a seal portion of the device from the space between the substrate 1 and the substrate 2 for example in FIGS. 1a and 1b-FIGS. 3a and 3b.

A kind of the gap gas is not limited if it has the humidity mentioned above, but it is preferred to use dry air, dry nitrogen gas, dry argon gas, dry helium gas, dry carbon dioxide gas, dry methane gas and so on. It is necessary to seal this gas in the information display panel so as to maintain the humidity mentioned above. For example, it is important to perform the operations of filling the display media and assembling the substrate under an atmosphere having a predetermined humidity and to apply a seal member and a seal method for preventing a humidity inclusion from outside of the device.

In the information display panel according to the invention, an interval between the substrates is not restricted if the display media can be moved and a contrast can be maintained, and it is adjusted normally to 10-500 μm, preferably 10-200 μm.

Moreover, it is preferred to control a volume occupied rate of the display media in a space between the opposed substrates to 5-70%, more preferably 5-60%. If the volume occupied rate of the display media exceeds 70%, the display media become difficult to move, and if it is less than 5%, a sufficient contrast cannot be obtained and a clear image display is not performed.

EXAMPLES

Hereinafter, the present invention will be explained further specifically with reference to the examples according to the invention and the comparative examples, but the present invention is not limited to the following examples. In the information display panel according to the examples and the comparative examples, the particles produced according to the method mentioned below were sealed in a space between the substrates together with a dry air having a humidity of not more than 50% RH, and the estimation was performed according to the standard mentioned above.

<Product 1 of Black Color Particles for Display Media (Black, Styrene/Divinylbenzen, Positively Charged)>

The positively charged black color particles for display media were produced as follows. 3 parts by weight of nigrosine compound (Bontoron N07: product of Orient Chemical Industries, Ltd.) as a positive charge control agent, and, 5 parts by weight of carbon black (SPECIAL BLACK 5: production of Degussa) as black pigment were dispersed by a sand mill in 94 parts by weight of styrene monomer (KANTO CHEMICAL CO., INC.) and 6 parts by weight of divinylbenzen (KANTO CHEMICAL CO., INC.), and then 2 parts by weight of lauryl peroxide (PEROYL L: product of NOF CORPORATION) was further dissolved therein so as to obtain a liquid. The thus obtained liquid was suspended and polymerized in a purified water in which 0.5% of polyoxyethylene ether sodium sulfate (LATEMURU E-118B: product of KAO CORPORATION) as a surface active agent was added, and then the thus polymerized liquid was subjected to a filtering and drying process. Then, the particles 1 having a particle diameter range of 0.1-50 μm and an average particle diameter of 10 μm were obtained by classifying the dried member by means of classifier (MDS-2: NIPPON PNEUMATIC MFG. CO., LTD.). A glass transition temperature Tg measured by DSC measurement method was 75° C.

<Product 2 of Black Color Particles for Display Media (Black, Styrene/Divinylbenzen, Positively Charged)>

The positively charged black color particles for display media were produced in the same manner as that of the particles 1 except that an amount of styrene monomer was modified to 35 parts by weight and an amount of divinylbenzen was modified to 65 parts by weight. Then, the particles 2 having a particle diameter range of 0.1-50 μm and an average particle diameter of 10 μm were obtained. A glass transition temperature Tg measured by DSC measurement method was not observed.

<Product 3 of Black Color Particles for Display Media (Black, Styrene/Divinylbenzen, Positively Charged)>

The positively charged black color particles for display media were produced in the same manner as that of the particles 1 except that an amount of styrene monomer was modified to 88 parts by weight and an amount of divinylbenzen was modified to 12 parts by weight. Then, the particles 3 having a particle diameter range of 0.1-50 μm and an average particle diameter of 10 μm were obtained. A glass transition temperature Tg measured by DSC measurement method was 80° C.

<Product 4 of Black Color Particles for Display Media (Black, Styrene/Divinylbenzen, Positively Charged)>

The positively charged black color particles for display media were produced in the same manner as that of the particles 1 except that an amount of styrene monomer was modified to 76 parts by weight and an amount of divinylbenzen was modified to 24 parts by weight. Then, the particles 4 having a particle diameter range of 0.1-50 μm and an average particle diameter of 10 μm were obtained. A glass transition temperature Tg measured by DSC measurement method was 85° C.

<Product 5 of Black Color Particles for Display Media (Black, Styrene/Divinylbenzen, Positively Charged)>

The positively charged black color particles for display media were produced in the same manner as that of the particles 1 except that an amount of styrene monomer was modified to 55 parts by weight and an amount of divinylbenzen was modified to 45 parts by weight. Then, the particles 3 having a particle diameter range of 0.1-50 μm and an average particle diameter of 10 μm were obtained. A glass transition temperature Tg measured by DSC measurement method was 95° C.

<Product 1 of White Color Particles for Display Media (White, Styrene/Divinylbenzen, Negatively Charged)>

The white color pigment was produced in such a manner that: titanium oxide (TIPAQUE CR50, product of ISHI-HARA SANGYO KAISHA, LTD.) and 1 wt % (with respect to an amount of titanium oxide) of titanate-based coupling agents (PLEANACT KRTTS: product of Ajinomoto Fine-Techno. Co., Inc.) were dispersed in 150 wt % (with respect to an amount of titanium oxide) of methanol and then stirred for 20 minutes by a paint shaker; and it was heated at 120° C. for 30 minutes and crushed.

The negatively charged white color particles for display media were produced as follows 5 parts by weight of phenol condensation compound (Bontoron E89: product of Orient Chemical Industries, Ltd.) as a negative charge control agent, and, 2 parts by weight of lauryl peroxide (PEROYL L: product of NOF CORPORATION) were dissolved in 30 parts by weight of titanium oxide to which the coupling treatment was performed as mentioned above, 94 parts by weight of styrene monomer (KANTO CHEMICAL CO., INC.) and 6 parts by weight of divinylbenzen (KANTO CHEMICAL CO., INC.), so as to obtain a liquid. The thus obtained liquid was suspended and polymerized in a purified water in which 0.5% of polyoxyethylene ether sodium sulfate (LATEMURU E-118B: product of KAO CORPORATION) as a surface active agent was added, and then the thus polymerized liquid was subjected to a filtering and drying process. Then, the particles 6 having a particle diameter range of 0.1-50 μm and an average particle diameter of 10 μm were obtained by classifying the dried member by means of classifier (MDS-2: NIPPON PNEUMATIC MFG. CO., LTD.). A glass transition temperature Tg measured by DSC measurement method was 75° C.

<Product 2 of White Color Particles for Display Media (White, Styrene/Divinylbenzen, Negatively Charged)>

The negatively charged white color particles for display media were produced in the same manner as that of the particles 6 except that an amount of styrene monomer was modified to 35 parts by weight and an amount of divinylbenzen was modified to 65 parts by weight. Then, the particles 7 having a particle diameter range of 0.1-50 μm and an average particle diameter of 10 μm were obtained. A glass transition temperature Tg measured by DSC measurement method was not observed.

<Product 3 of White Color Particles for Display Media (White, Styrene/Divinylbenzen, Negatively Charged)>

The negatively charged white color particles for display media were produced in the same manner as that of the particles 6 except that an amount of styrene monomer was modified to 88 parts by weight and an amount of divinylbenzen was modified to 12 parts by weight. Then, the particles 8 having a particle diameter range of 0.1-50 μm and an average particle diameter of 10 μm were obtained. A glass transition temperature Tg measured by DSC measurement method was 80° C.

<Product 4 of White Color Particles for Display Media (White, Styrene/Divinylbenzen, Negatively Charged)>

The negatively charged white color particles for display media were produced in the same manner as that of the particles 6 except that an amount of styrene monomer was modified to 76 parts by weight and an amount of divinylbenzen was modified to 24 parts by weight. Then, the particles 9 having a particle diameter range of 0.1-50 μm and an average particle diameter of 10 μm were obtained. A glass transition temperature Tg measured by DSC measurement method was 85° C.

<Product 5 of White Color Particles for Display Media (White, Styrene/Divinylbenzen, Negatively Charged)>

The negatively charged white color particles for display media were produced in the same manner as that of the particles 6 except that an amount of styrene monomer was modified to 55 parts by weight and an amount of divinylbenzen was modified to 45 parts by weight. Then, the particles 10 having a particle diameter range of 0.1-50 μm and an average particle diameter of 10 μm were obtained. A glass transition temperature Tg measured by DSC measurement method was 95° C.

<Experimental Conditions, Estimation Method and Estimation Results (Referred to Table 1, Table 2)>

Experimental Conditions:

Heat resistance test (keeping a test piece in an atmosphere at 100° C. for 1.5 hours) was performed. In this case, use was made of the particles 9 as the white color particles for display media with respect to a panel reversing test of the black color particles for display media, and, use was made of the particles 4 as the black color particles for display media with respect to a panel reversing test of the white color particles for display media.

Estimation Method:

After the heat resistance test mentioned above, a reversing test (drive test performed by applying a voltage of 2V per a gap of 1 μm between the substrates) was performed under such a condition that the information display panel was installed in a drive device.

Estimation Results:

Whether the reversing was performed or not (whether the particles were fused and bonded or not), contrast and endurance property were estimated.

Comparative Example 1

As the positively charged black color particles for display media, use was made of the particles 1. As a result, the estimation results such as reversing possibility: x, contrast: estimation impossible and endurance property: estimation impossible were obtained as shown in Table 1.

Comparative Example 2

As the positively charged black color particles for display media, use was made of the particles 2. As a result, the estimation results such as reversing possibility: ○, contrast: x and endurance property: x were obtained as shown in Table 1.

Example 1

As the positively charged black color particles for display media, use was made of the particles 3. As a result, the estimation results such as reversing possibility: ○, contrast: ○ and endurance property: ○ were obtained as shown in Table 1. It was possible to perform the reversing operation even under the heat resistance condition such that the reversing operation was not performed heretofore due to a low heat resistance of resin.

Example 2

As the positively charged black color particles for display media, use was made of the particles 4. As a result, the estimation results such as reversing possibility: ○, contrast: ○ and endurance property: ○ were obtained as shown in Table 1. It was possible to perform the reversing operation even under the heat resistance condition such that the reversing operation was not performed heretofore due to a low heat resistance of resin.

Example 3

As the positively charged black color particles for display media, use was made of the particles 5. As a result, the estimation results such as reversing possibility: ○, contrast: ○ and endurance property: ○ were obtained as shown in Table 1. It was possible to perform the reversing operation even under the heat resistance condition such that the reversing operation was not performed heretofore due to a low heat resistance of resin.

Comparative Example 3

As the negatively charged white color particles for display media, use was made of the particles 6. As a result, the estimation results such as reversing possibility: x, contrast: estimation impossible and endurance property: estimation impossible were obtained as shown in Table 2.

Comparative Example 4

As the negatively charged white color particles for display media, use was made of the particles 7. As a result, the estimation results such as reversing possibility: ○, contrast: x and endurance property: x were obtained as shown in Table 2.

Example 4

As the negatively charged white color particles for display media, use was made of the particles 8. As a result, the estimation results such as reversing possibility: ○, contrast: ○ and endurance property: ○ were obtained as shown in Table 2. It was possible to perform the reversing operation even under the heat resistance condition such that the reversing operation was not performed heretofore due to a low heat resistance of resin.

Example 5

As the negatively charged white color particles for display media, use was made of the particles 9. As a result, the estimation results such as reversing possibility: ○, contrast: ○ and endurance property: ○ were obtained as shown in Table 2. It was possible to perform the reversing operation even under the heat resistance condition such that the reversing operation was not performed heretofore due to a low heat resistance of resin.

Example 6

As the negatively charged white color particles for display media, use was made of the particles 10. As a result, the estimation results such as reversing possibility: ○, contrast: ○ and endurance property: ○ were obtained as shown in Table 2. It was possible to perform the reversing operation even under the heat resistance condition such that the reversing operation was not performed heretofore due to a low heat resistance of resin.

In the above explanations, symbol ○ shows a good condition, symbol x shows a no good condition and symbol Δ shows a slightly no good condition.

TABLE 1

Examples and comparative examples of the black color particles for display media (in the panel reversing estimation, use was made of styrene/divinylbenzen = 76/24, TiO$_2$ = 30 phr as the white color particles for display media)

| | | Comparative example 1 | Comparative example 2 | Example 1 | Example 2 | Example 3 |
|---|---|---|---|---|---|---|
| Materials of black color particles for display media | Styrene | 94 | 35 | 88 | 76 | 55 |
| | Divinylbenzen | 6 | 65 | 12 | 24 | 45 |
| | Carbon black | 5 | 5 | 5 | 5 | 5 |
| Panel reversing estimation[1] | Reversing possibility | X | ○ | ○ | ○ | ○ |
| | Contrast (data)[2] | — | 4.3 | 6.9 | 6.1 | 5.5 |
| | Contrast (usable or not)[3] | — | X | ○ | ○ | ○ |
| | Endurance | — | X | ○ | ○ | ○ |

[1] Panel reversing test (2 V/panel gap (μm)) after 100° C. × 1.5 hr
[2] When it was assumed that an optical density difference between black color display and white color display, which were measured by Macbeth densitometer (RD-19, product of SAKATA INX CORPORATION) was R, contrast data were obtained by $10^R$.
[3] ○ shows that the contrast data were not less than 5, and X shows that the contrast data were less than 5.

TABLE 2

Examples and comparative examples of the white color particles for display media (in the panel reversing estimation, use was made of styrene/divinylbenzen = 76/24, Carbon black = 5 phr as the black color particles for display media)

| | | Comparative example 3 | Comparative example 4 | Example 4 | Example 5 | Example 6 |
|---|---|---|---|---|---|---|
| Materials of white color particles for display media | Styrene | 94 | 35 | 88 | 76 | 55 |
| | Divinylbenzen | 6 | 65 | 12 | 24 | 45 |
| | TiO$_2$ | 5 | 5 | 5 | 5 | 5 |
| Panel reversing estimation[1] | Reversing possibility | X | ○ | ○ | ○ | ○ |
| | Contrast (data)[2] | — | 4.0 | 6.5 | 6.1 | 5.8 |
| | Contrast (usable or not)[3] | — | X | ○ | ○ | ○ |
| | Endurance | — | X | ○ | ○ | ○ |

[1] Panel reversing test (2 V/panel gap (μm)) after 100° C. × 1.5 hr
[2] When it was assumed that an optical density difference between black color display and white color display, which were measured by Macbeth densitometer (RD-19, product of SAKATA INX CORPORATION) was R, contrast data were obtained by $10^R$.
[3] ○ shows that the contrast data were not less than 5, and X shows that the contrast data were less than 5.

The information display panel, which is manufactured according to the invention, is preferably applicable to the display unit for mobile equipment such as notebook personal computers, PDAs, cellular phones, handy terminals and so on; to the electric paper such as electric books, electric newspapers, electric manual (instruction) and so on; to the bulletin boards such as signboards, posters, blackboards and so on; to the image display unit for electric calculator, home electric application products, auto supplies and so on; to the card display unit such as point cards, IC cards and so on; and to the display unit for electric advertisements, electric POPs, electric price tags, electric shelf tags, electric musical score, RF-ID device and so on.

The invention claimed is:

1. Particles for display media constituting the display media used for an information display panel, in which the display media having optical reflectance and charge characteristics are sealed between two substrates, at least one substrate being transparent, and, in which the display media, to which an electrostatic field is applied, are made to move so as to display information such as an image, comprising the particles for display media having a substantially circular shape produced by a suspension polymerization of particle materials including monomer, wherein a part of the monomer is a cross-linking monomer and an amount of the cross-linking monomer is not less than 10 parts by weight and less than 50 parts by weight,
wherein a glass transition temperature Tg of the resin constituting the particles for display media is not less than 60° C.

2. The particles for display media according to claim 1, wherein the cross-linking monomer is divinylbenzen capable of copolymerization, and, in the case of being polymerized by elementary substance, the glass transition temperature Tg of the resin is not less than 130° C., or, the glass transition temperature Tg is not observed.

3. The particles for display media according to claim 1, wherein another monomer for copolymerizing the cross-linking monomer is one or more monomers selected from the plural groups of monomers including at least acrylic monomer, methacrylic monomer and styrene monomer.

4. The particles for display media according to claim 1, wherein a charge amount of the particles for display media measured by a blow-off method utilizing carriers is 10-100 μC/g in an absolute value.

5. The particles for display media according to claim 1, wherein the particles in which the maximum surface potential, in the case that the surface of the particles is charged by a generation of Corona discharge caused by applying a voltage of 8 KV to a Corona discharge device deployed at a distance of 1 mm from the surface, is 300 V or greater at 0.3 second after the discharge.

6. The particles for display media according to claim 1, wherein a color of the particles for display media is a white color and/or a black color.

7. An information display panel comprising a construction: such that at least one or more groups of display media including the particles for display media set forth in claim 1 are sealed between two opposed substrates, at least one substrate being transparent; and such that the display media, to which an electrostatic field is applied, are made to move so as to display information such as an image.

8. Particles for display media constituting the display media used for an information display panel, in which the display media having optical reflectance and charge characteristics are sealed between two substrates, at least one substrate being transparent, and, in which the display media, to which an electrostatic field is applied, are made to move so as to display information such as an image, comprising the particles for display media having a substantially circular shape produced by a suspension polymerization of particle materials including monomer, wherein a part of the monomer is a cross-linking monomer and an amount of the cross-linking monomer is not less than 10 parts by weight and less than 50 parts by weight,
wherein the cross-linking monomer is divinylbenzen capable of copolymerization, and, in the case of being polymerized by elementary substance, a glass transition temperature Tg of the resin is not less than 130° C., or, the glass transition temperature Tg is not observed.

9. Particles for display media constituting the display media used for an information display panel, in which the display media having optical reflectance and charge characteristics are sealed between two substrates, at least one substrate being transparent, and, in which the display media, to which an electrostatic field is applied, are made to move so as to display information such as an image, comprising the particles for display media having a substantially circular shape produced by a suspension polymerization of particle materials including monomer, wherein a part of the monomer is a cross-linking monomer and an amount of the cross-linking monomer is not less than 10 parts by weight and less than 50 parts by weight,
wherein a charge amount of the particles for display media measured by a blow-off method utilizing carriers is 10-100 μC/g in an absolute value.

10. Particles for display media constituting the display media used for an information display panel, in which the display media having optical reflectance and charge characteristics are sealed between two substrates, at least one substrate being transparent, and, in which the display media, to which an electrostatic field is applied, are made to move so as to display information such as an image, comprising the particles for display media having a substantially circular shape produced by a suspension polymerization of particle materials including monomer, wherein a part of the monomer is a cross-linking monomer and an amount of the cross-linking monomer is not less than 10 parts by weight and less than 50 parts by weight,
wherein the particles in which the maximum surface potential, in the case that the surface of the particles is charged by a generation of Corona discharge caused by applying a voltage of 8 KV to a Corona discharge device deployed at a distance of 1 mm from the surface, is 300 V or greater at 0.3 second after the discharge.

* * * * *